Patented Aug. 9, 1938

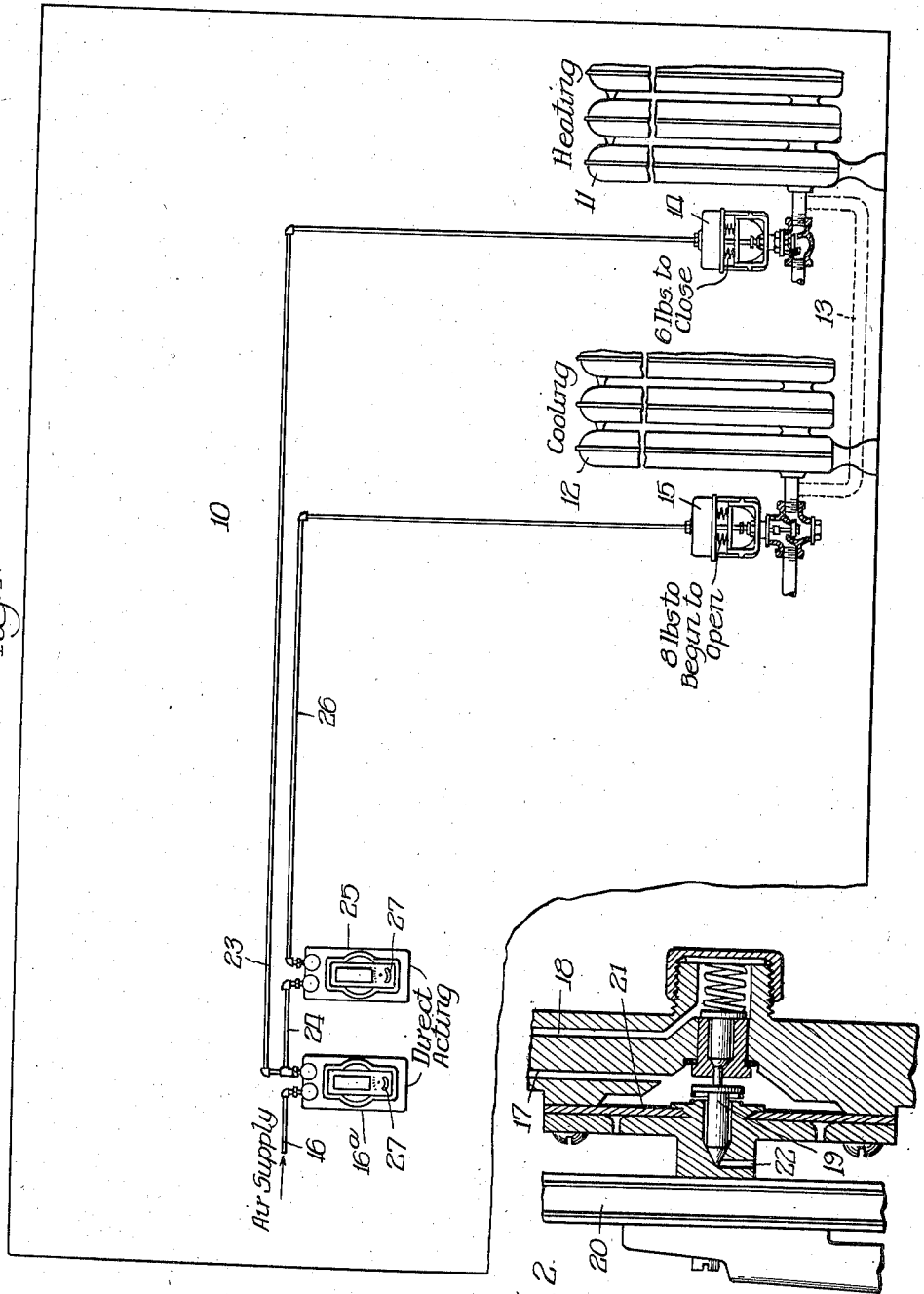

2,125,889

UNITED STATES PATENT OFFICE 2,125,889

THERMOSTATIC CONTROL FOR HEATING AND COOLING SYSTEMS

Alvin L. Crump, Evanston, Ill., assignor to The Powers Regulator Company, Chicago, Ill., a corporation of Illinois Application November 9, 1936, Serial No. 109,851

6 Claims. (Cl. 236—1)

My invention relates to means for thermostatically controlling the temperature of a space and contemplates the use of apparatus by which both heating and cooling effects may be secured.

In carrying out my invention I provide heat transfer elements, either in the form of a single unit that may be used alternately for heating and cooling or in the form of separate elements, one for heating and one for cooling. In the matter of thermostatic control for such elements it is desirable to provide mechanism whereby the cooling effect shall be secured only when the heat controlling valve has been closed, and further, that the occupant of the space should have means for selecting the desired temperatures, both as to heating and cooling.

The desired results are accomplished in the apparatus here disclosed, in which extreme simplicity is provided.

The invention will be more readily understood by reference to the accompanying drawing, in which, Fig. 1 is a diagrammatic illustration of an installation of apparatus such as contemplated by me; and, Fig. 2 is an enlarged fragmentary sectional view through a common form of thermostat of the gradual-acting or leak type, adapted for use in the system.

In the drawing I have indicated a space 10, within which two heat transfer devices 11—12 are shown, the former being adapted to receive a heating medium and the latter a cooling medium. I may prefer to utilize the heat transfer element 11 for both heating and cooling and have so indicated the possibility by the pipe 13 in dotted lines. By means of this pipe the cooling medium may be delivered directly to the heat transfer element 11. Diaphragm valves 14—15 are provided for controlling the admission of heating and cooling mediums, the valve 14 being direct-acting and the valve 15 being reverse-acting.

By the term "direct acting" I mean a valve that is seated by air pressure applied to the top of a diaphragm, while by reverse acting I mean a valve that is opened by pressure applied to the top of a diaphragm.

As indicated, I provide different spring resistance to movement of the respective valves. As an example, I have indicated a six pound spring resistance in the heat control valve and an eight pound resistance in the valve for controlling the cooling medium. By this I mean a resistance that will be overcome by an air pressure of six pounds, or eight pounds per square inch, as the case may be.

Air under pressure is supplied through the pipe 16 to the inlet passage 17 of a gradually-acting thermostat 16a, of common form, a cross-section of the internal construction of which is shown in Fig. 2. In such thermostats there is provided an inlet passage 17, an outlet passage 18 and a double seated valve 19. A bellows 20 containing a thermostatic fluid bears against a diaphragm 21, the movement of which alternately permits the passage of air to the outlet 18 and to a leak port 22. It will be seen that in this type of instrument, known as direct-acting, upon an increase in the temperature of the space 10 within which it is located, the parts will operate to pass air under pressure to the outlet passage 18. A pipe 23 is connected to said outlet passage and to the diaphragm valve 14. Thus upon an increase in temperature, air will be directed to the heat control valve tending to close the same.

The common practice is to so adjust the instrument that two pounds per square inch of pressure is developed in the valve control pipe for each degree of increase over the setting of the thermostat. Thus with a spring resistance, in the heat control valve that will be overcome by a pressure of six pounds per square inch, there is a normal variation of three degrees between fully open and fully closed positions of said valve, and, consequently, with a pressure of six pounds per square inch in the discharge passage from the thermostat, the heat control valve will be fully closed.

A pipe 24 is connected at one end of a T to the pipe 23 and at its other end to the inlet passage to a thermostat 25, which is a duplicate of the thermostat 16a, while a pipe 26 is connected to the outlet from the thermostat 25 and to the valve 15 for controlling the cooling medium. This valve 15 has a spring resistance that will be overcome by an air pressure of eight pounds per square inch and is reverse-acting, as stated. Both the thermostats have adjusting mechanism of common form indicated generally by the numeral 27.

In the described arrangement, it will be seen that the valve 15 is normally closed; that the thermostat 25 receives no air for operation until pressure is developed in the outlet passage from the thermostat 16a; and that it is necessary for a pressure of at least eight pounds to develop in the outlet passage of the thermostat 16a before sufficient pressure is available for opening the valve 15. It is, therefore, unimportant what the adjustment is in the respective thermostats as it would be impossible for both the heating and cooling mediums to be delivered at the same time. It is, however, possible for the occupant to adjust the respective instruments to secure any desired result. If, for example, he wishes the cooling medium to be supplied immediately after the temperature in the space reaches the upper limit of the heat adjustment, he will set the two instruments for the same temperature, say 72, in which case the valve for the cooling medium will begin to open as the temperature reaches 73. If, however, he wishes the cooling medium supplied only at a higher temperature, say 76, he will so adjust the thermostat 25, and secure that result. With that adjustment and with the thermostat 16a, set at 72, there will be neither heating nor cooling medium supplied while the temperature is in the range between 72 and 76.

It will be understood that I may secure the same result as heretofore described by using reverse-acting thermostats and diaphragm valves in a reverse position to that shown. It will be understood, also, that wherever I have in the claims referred to heating and cooling devices, I contemplate a single heat transfer device adapted for alternate use for heating and cooling.

I claim:

1. The combination, in a space, of a heating device and a cooling device and means for delivering heating and cooling mediums thereto, a direct-acting diaphragm valve for controlling the admission of a medium to one device and a reverse acting valve for controlling the admission of medium to the other device, a thermostat and a pipe connecting the outlet therefrom to one of said diaphragm valves, a second thermostat and a pipe connecting the outlet therefrom to the other diaphragm valve and a pipe connecting the inlet to said second thermostat to the outlet pipe from the first thermostat.

2. The combination, in a space, of a heating device and a cooling device and means for delivering heating and cooling mediums thereto, a direct-acting diaphragm valve for controlling the admission of a medium to one device and a reverse-acting valve for controlling the admission of medium to the other device, a thermostat and a pipe connecting the outlet therefrom to one of said diaphragm valves, a second thermostat and a pipe connecting the outlet therefrom to the other diaphragm valve and a pipe connecting the inlet to said second thermostat to the outlet pipe from the first thermostat, the spring resistance to movement of the respective diaphragm valves being such that under the same air pressure the valve controlling the admission of the heating medium is closed before the other valve begins to open.

3. The combination, in a space, of a heating device and a cooling device and means for delivering heating and cooling mediums thereto, a direct-acting diaphragm valve for controlling the admission of heating medium to the heating device and a reverse-acting diaphragm valve for controlling the admission of cooling medium to said cooling device, a thermostat and a pipe connecting the outlet from the same to the heat control valve, said thermostat being arranged to admit air under pressure to said pipe and valve upon an increase in temperature over that for which the thermostat is set whereby to tend to close said valve, a second thermostat and a pipe connecting the outlet from the same to said reverse acting valve for the cooling medium, said second thermostat being arranged to admit air under pressure to the valve for the cooling medium and to tend to open the same upon an increase in temperature over that for which the said second thermostat is set, and a pipe connecting the inlet of said second thermostat to the outlet pipe from the first thermostat.

4. The combination, in a space, of a heating device and a cooling device and means for delivering heating and cooling mediums thereto, a direct-acting diaphragm valve for controlling the admission of heating medium to the heating device and a reverse acting diaphragm valve for controlling the admission of cooling medium to said cooling device, a thermostat and a pipe connecting the outlet from the same to the heat control valve, said thermostat being arranged to admit air under pressure to said pipe and valve upon an increase in temperature over that for which the thermostat is set whereby to tend to close said valve, a second thermostat and a pipe connecting the outlet from the same to said reverse-acting valve for the cooling medium, said second thermostat being arranged to admit air under pressure to the valve for the cooling medium and to tend to open the same upon an increase in temperature over that for which the said second thermostat is set, and a pipe connecting the inlet of said second thermostat to the outlet pipe from the first thermostat, the spring resistance to movement of the valve for the cooling medium being greater than the spring resistance of the valve for the heating medium, whereby under the same air pressure the valve for the cooling medium will not begin to open until a predetermined higher temperature has been reached after the heat valve is closed.

5. The combination, in a space, of a heating device and a cooling device and means for delivering heating and cooling mediums thereto, a direct-acting diaphragm valve for controlling the admission of a medium to one device and a reverse-acting valve for controlling the admission of medium to the other device, a gradual-acting thermostat and a pipe connecting the outlet therefrom to one of said diaphragm valves, a second gradual-acting thermostat and a pipe connecting the outlet therefrom to the other diaphragm valve and a pipe connecting the inlet to said second thermostat to the outlet pipe from the first thermostat, the spring resistance to movement of the respective diaphragm valves being such that under the same air pressure the valve controlling the admission of the heating medium is closed before the other valve begins to open.

6. The combination, in a space, of a heating device and a cooling device and means for delivering heating and cooling mediums thereto, a direct-acting diaphragm valve for controlling the admission of heating medium to the heating device and a reverse acting diaphragm valve for controlling the admission of cooling medium to said cooling device, a direct acting thermostat and a pipe connecting the outlet from the same to the heat control valve, said direct acting thermostat being arranged to admit air under pressure to said pipe and valve upon an increase in temperature over that for which the thermostat is set whereby to tend to close said valve, a second thermostat and a pipe connecting the outlet from the same to said reverse acting valve for the cooling medium said second thermostat being arranged to admit air under pressure to the valve for the cooling medium and to tend to open the same upon an increase in temperature over that for which the said second thermostat is set, and a pipe connecting the inlet of said second thermostat to the outlet pipe from the first thermostat.

ALVIN L. CRUMP.